(12) United States Patent
Charles et al.

(10) Patent No.: US 10,831,745 B2
(45) Date of Patent: Nov. 10, 2020

(54) DATABASE PROTOCOLS AND RETRIEVAL TECHNIQUES

(71) Applicant: WAL-MART STORES, INC., Bentonville, AR (US)

(72) Inventors: Kevin Matthew Charles, Bentonville, AR (US); John R. Frerking, Prairie Grove, AR (US); Richard Talmadge Jackson, Jr., Bella Vista, AR (US); Clifford V. Vanderpool, Bentonville, AR (US); Michael John Karagines, Brooksville, FL (US)

(73) Assignee: WALMART APOLLO, LLC, Bentonville, AR (US)

( * ) Notice: Subject to any disclaimer, the term of this patent is extended or adjusted under 35 U.S.C. 154(b) by 314 days.

(21) Appl. No.: 15/883,979

(22) Filed: Jan. 30, 2018

(65) Prior Publication Data

US 2019/0236180 A1    Aug. 1, 2019

(51) Int. Cl.
*G06F 16/00* (2019.01)
*G06F 16/24* (2019.01)
*G06F 3/06* (2006.01)
*G06F 16/23* (2019.01)
*G06F 16/16* (2019.01)

(52) U.S. Cl.
CPC ............ *G06F 16/24* (2019.01); *G06F 3/0617* (2013.01); *G06F 16/162* (2019.01); *G06F 16/23* (2019.01)

(58) Field of Classification Search
None
See application file for complete search history.

(56) References Cited

U.S. PATENT DOCUMENTS

| | | | |
|---|---|---|---|
| 10,409,770 B1* | 9/2019 | Ye | G06F 16/178 |
| 2011/0258160 A1* | 10/2011 | Lee | G06Q 10/00 |
| | | | 707/626 |
| 2016/0140137 A1* | 5/2016 | Konik | G06F 16/21 |
| | | | 707/692 |
| 2016/0283528 A1* | 9/2016 | Benke | G06F 16/2365 |
| 2017/0270149 A1* | 9/2017 | Grosman | G06F 16/2358 |
| 2018/0082491 A1* | 3/2018 | Povolny | G06K 9/18 |
| 2018/0359375 A1* | 12/2018 | Seo | H04N 1/00212 |

* cited by examiner

*Primary Examiner* — Bai D Vu
(74) *Attorney, Agent, or Firm* — Bryan Cave Leighton Paisner LLP (57) ABSTRACT

A system includes one or more processing modules and one or more non-transitory storage modules storing computing instructions configured to run on the one or more processing modules and perform acts of: receiving, from a user computer, a destructive read request including header information indicating that a record stored in a persistent database is to be deleted after the record is successfully read from the persistent database; in response to receiving the destructive read request, retrieving the record, which was identified by the destructive read request, from the persistent database; after retrieving the record, receiving a success signal that confirms that the record was successfully read from the persistent database; and in response to receiving the success signal, automatically deleting the record, which was identified by the destructive read request, from the persistent database without receiving another instruction to delete the record. Other embodiments are disclosed herein.

20 Claims, 6 Drawing Sheets

510— Receiving, from a user computer, a destructive read request including header information indicating that a record stored in a persistent database is to be deleted after the record is successfully read from the persistent database 520— Retrieving the record identified by the destructive read request from the persistent database 530— Transmitting the record to the user computer 540— Receiving a success signal that confirms that the record was successfully read from the persistent database 550— Deleting the record identified by the destructive read request from the persistent database after the success signal is received

DATABASE PROTOCOLS AND RETRIEVAL TECHNIQUES

TECHNICAL FIELD

This disclosure relates generally to improved database protocols that can utilize destructive read commands to retrieve and delete database records in a manner that can increase network bandwidth, reduce network traffic and facilitate efficient database processing.

BACKGROUND

Various systems rely on network configurations that enable multiple users to access a database over a network. A database may be stored on a conventional database server that is accessible to computer devices operated by the users. The conventional database server may be sufficient to serve records from the database in scenarios having a limited number of users. However, in some situations, the conventional database server is not able to satisfy network demand due to massive amounts of network traffic (e.g., due to thousands of users simultaneously accessing the database over the network). In these situations, the conventional database server can be overloaded, thus causing server lag and/or delays in processing network requests. In severe cases, the conventional database server can even crash and cease to function.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 1:
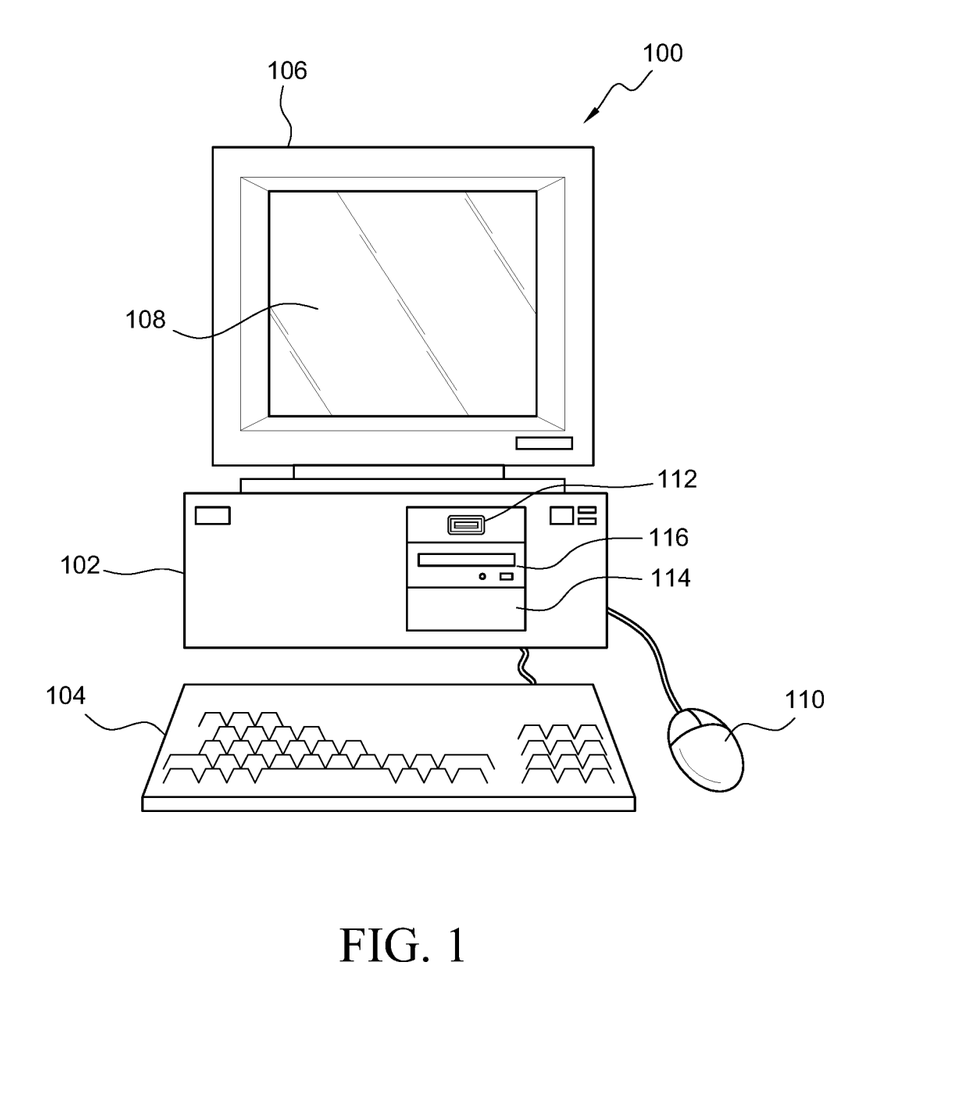
FIG. 1 illustrates a front elevational view of a computer system that is suitable for implementing various embodiments of the systems disclosed in FIGS. 3 and 6.
Figure 2:
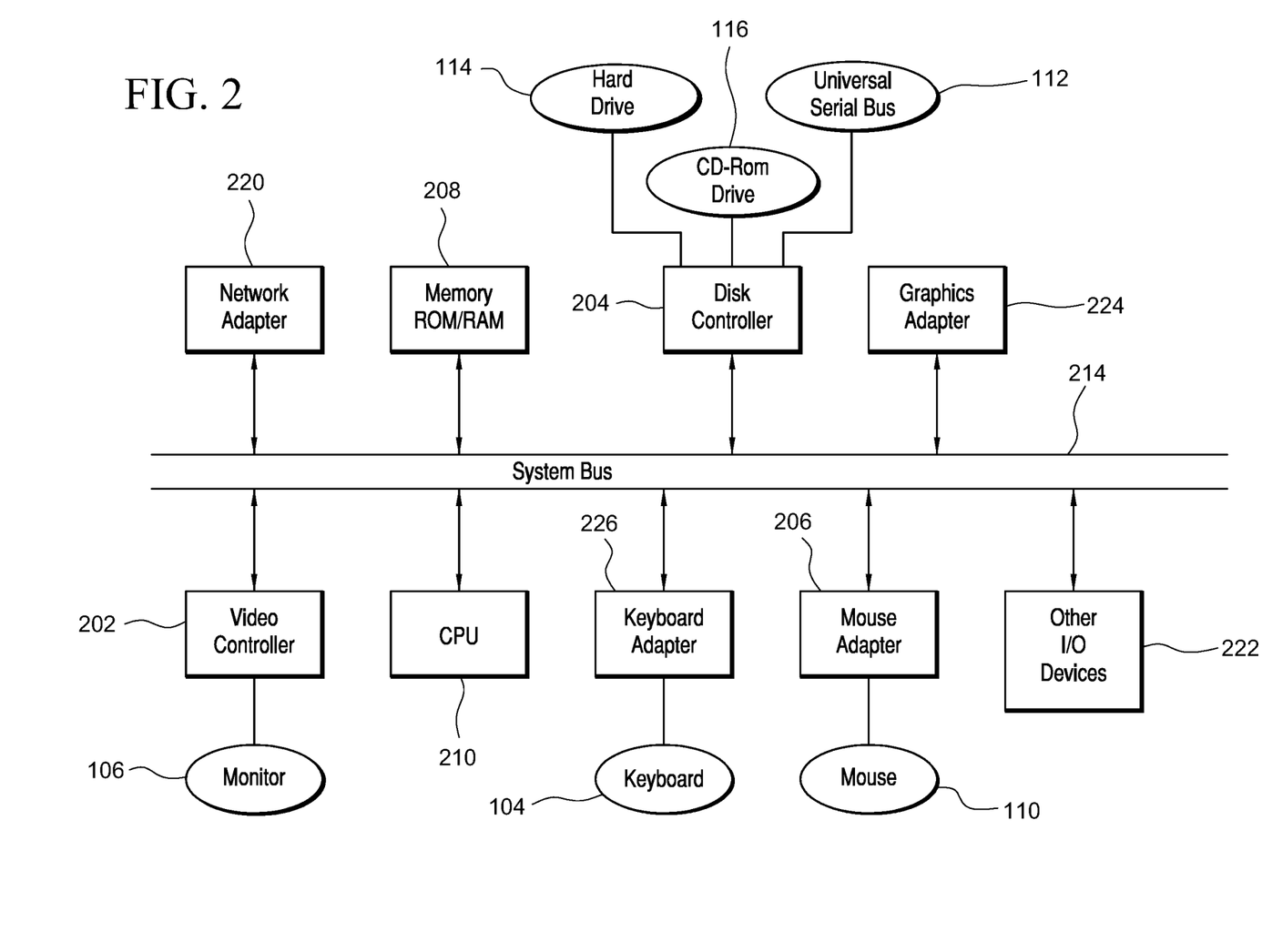
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
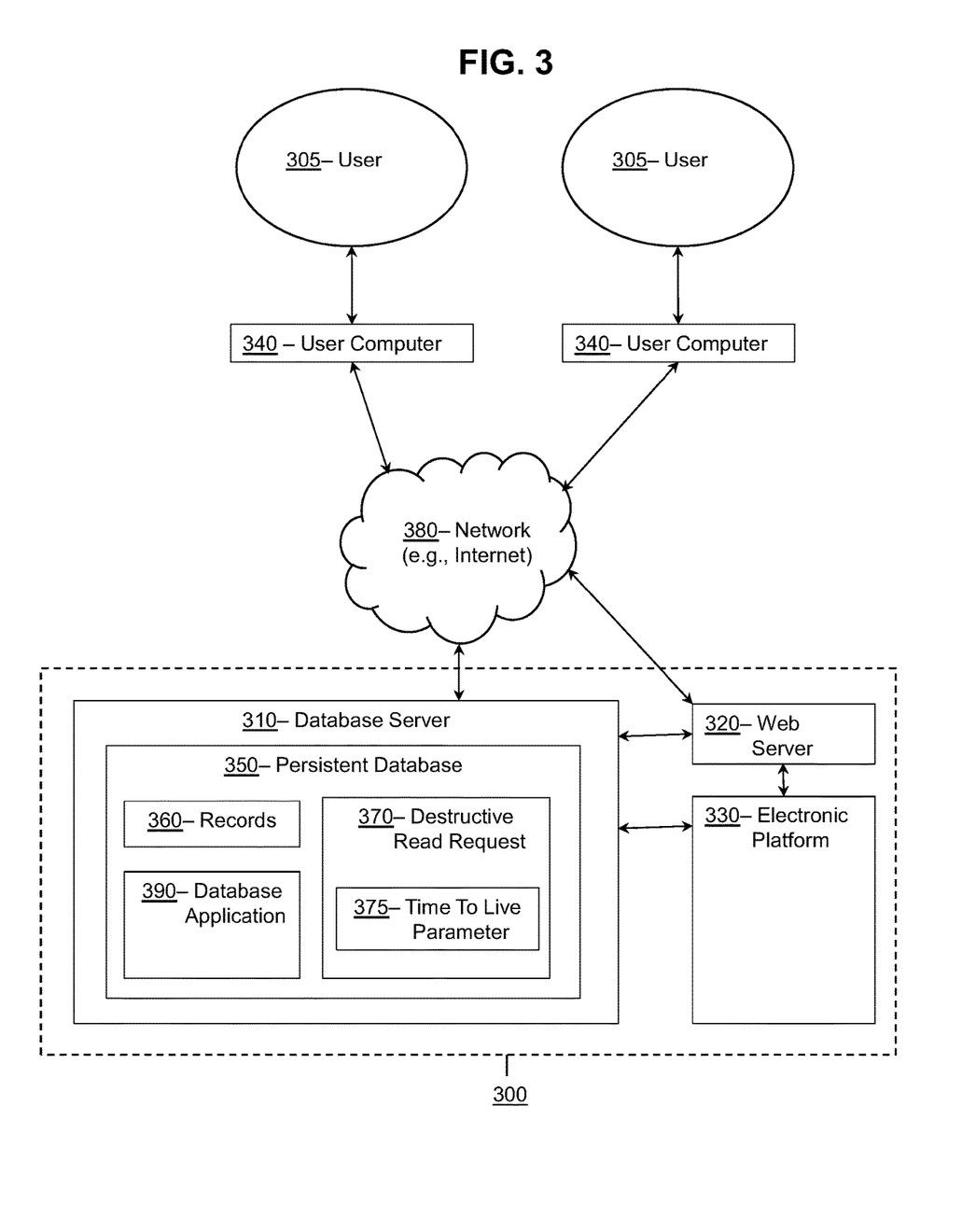
FIG. 3 illustrates a representative block diagram of a system according to certain embodiments.

Turning ahead in the drawings, FIG. 3 illustrates a block diagram of a system 300 that can be employed for increasing network bandwidth, reducing network traffic, and improving database processing. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a database server 310, a web server 320, and/or an electronic platform 330. The database server 310, the web server 320, and the electronic platform 330 can each be a computer system, such as computer system 100 (FIG. 1), as described above, and can each be a single computer, a single server, or a cluster or collection of computers or servers, or a cloud of computers or servers. In another embodiment, a single computer system can host each of two or more the database server 310, the web server 320, and the electronic platform 330. Additional details regarding the database server 310, the web server 320, and the electronic platform 330 are described herein.

In many embodiments, system 300 also can comprise user computers 340. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through a network 380 (e.g., the Internet) with user computers (e.g., 340). In certain embodiments, user computers 340 can be desktop computers, laptop computers, smart phones, tablet devices, and/or other endpoint devices. Web server 320 can host one or more websites. For example, web server 320 can host an online shopping website that allows users to browse and/or search for products, to add products to an electronic shopping cart, and/or to purchase products, in addition to other suitable activities.

In many embodiments, the database server 310, the web server 320, and the electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the database server 310, the web server 320, and the electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the database server 310, the web server 320, and the electronic platform 330. In a similar manner, the processing module(s) and the memory storage module(s) can be local and/or remote to each other.

In many embodiments, the database server 310, the web server 320, and the electronic platform 330 can be configured to communicate with one or more user computers 340. In some embodiments, user computers 340 also can be referred to as customer computers. In some embodiments, the database server 310, the web server 320, and the electronic platform 330 can communicate or interface (e.g., interact) with one or more customer computers (such as user computers 340) through a network 380, e.g., such as one that includes the Internet. Network 380 can be an intranet that is not open to the public. Accordingly, in many embodiments, the database server 310, the web server 320, and the electronic platform 330 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 also can be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the database server 310, the web server 320, and the electronic platform 330 also can be configured to communicate with one or more databases (e.g., such as persistent database 350). The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between the database server 310, the web server 320, and the electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

A number of embodiments described herein can include a system. The system can include one or more processing modules and one or more non-transitory storage modules storing computing instructions configured to run on the one or more processing modules. The one or more storage modules can be configured to run on the one or more processing modules and perform the acts of: receiving, from a user computer, a destructive read request including header information indicating that a record stored in a persistent database is to be deleted after the record is successfully read from the persistent database; in response to receiving the destructive read request, retrieving the record, which was identified by the destructive read request, from the persistent database; after retrieving the record, receiving a success signal that confirms that the record was successfully read from the persistent database; and in response to receiving the success signal, automatically deleting the record, which was identified by the destructive read request, from the persistent database without receiving another instruction to delete the record.

Various other embodiments described herein include a method. The method can include: receiving, from a user computer, a destructive read request including header information indicating that a record stored in a persistent database is to be deleted after the record is successfully read from the persistent database; in response to receiving the destructive read request, retrieving the record, which was identified by the destructive read request, from the persistent database; after retrieving the record, receiving a success signal that confirms that the record was successfully read from the persistent database; and in response to receiving the success signal, automatically deleting the record, which was identified by the destructive read request, from the persistent database without receiving another instruction to delete the record.

As mentioned above, a conventional database server is not able to satisfy network demand when the network is experiencing massive amounts of network traffic (e.g., due to thousands of users simultaneously accessing a database stored on the database server over the network). In certain systems, the network traffic includes large volumes of requests to read and delete records in a database. Notably, in many cases, the records requested are no longer useful after they have been read. For example, the records can represent "one-time use" records (e.g., passwords or digital coupons that are only able to be used a single time) that can be discarded immediately after being read and/or "time-limited" records that are only useful for a limited duration after they are read (e.g., a password or digital coupon that must be used within 24 hours of being read). Separate requests for reading and deleting these "one-time use" and "time-limited" records are submitted for each of the records that are accessed by the users. These separate requests can unnecessarily increase the level of network traffic when there are many users accessing the database over the network. The high level of network traffic can cause the conventional database server to become overloaded, thus resulting in server lag or latency in processing database requests and/or causing the conventional database server to crash entirely.

The techniques described herein relate to improved database protocols that serve to increase network bandwidth, decrease network traffic and improve database efficiency, thus allowing more users to simultaneously access a database over a network. The database protocols utilize destructive read requests to accomplish these advantages. Generally speaking, a destructive read request can represent a single database request that enables both reading of a database record and deleting of the database record after it is read (either immediately or upon expiration of a time to live parameter as described in further detail below). Utilizing the destructive read requests can significantly reduce or eliminate the number of delete requests submitted to a database system, thereby decreasing network traffic and increasing available bandwidth. Moreover, combining the read and delete operations into a single operation also promotes efficiency for the database and enables the database to process an increased number of operations.

Referring back to FIG. 3, the database server 310 stores a persistent database 350 that comprises a plurality of records 360. The persistent database 350 can generally represent any type of database or data store that is persistent in nature. In certain embodiments, the persistent database 350 is a NoSQL database (e.g., a key-value, wide column, graph or document-oriented database) or other non-relational database. The NoSQL database can support or substantially support ACID (Atomic, Consistent, Isolation & Durable) transactions. These types of databases are particularly useful for handling "big data" and real-time web applications, and the techniques discussed here can be particularly well suited for use with these types of databases.

The term "records," as used herein, should not be construed as limiting. Rather, the term can generally be used to represent any type of data that is able to be stored in a persistent database 350. For example, the records 360 can comprise any or all of the following: text strings, multimedia content (e.g., images, videos, audio recordings, animations, etc.), numerical data (e.g., integers, real numbers, etc.), objects, web pages, web content and/or any other digital data. In certain embodiments, the records 360 can store information related to promotional content for a website that is hosted by the electronic platform 330 and/or web server 320. The promotional content can include data associated with digital coupons, discount codes, sales offerings and other related data. The records 360 can represent "one-time use" records that can be discarded immediately after being read from the persistent database 350, and/or time-limited records that can be discarded within a pre-determined period of time after being read from the persistent database 350.

The persistent database 350 includes a database application 390 that is configured to perform various functions for maintaining the database 350. For example, the database application 390 can be configured to facilitate adding, editing and/or deleting of records 360 from the database 350. The database application 390 also can be configured to restrict and control access to the database (e.g., to enforce read, write and delete permissions for users 305 attempting to access the persistent database 350). In certain embodiments, the database application 390 can include or be integrated with a general-purpose or special-purpose database management system (DBMS). In certain embodiments, the database application 390 can be configured for use with a NoSQL database.

Users 305 operating user computers 340 can submit requests to read, write, edit, delete or otherwise access the records 360 in the persistent database 350. The database application 390 determines whether the users 305 are authorized to perform the requested operations on the records in the persistent database 350. Authorized users 305 are permitted to execute the requested operations, and non-authorized users 305 are denied from executing the requested operations.

In contrast to conventional database systems, destructive read requests 370 can be submitted to the persistent database 350 by the users 305 and/or by other components of the system 300 (e.g., by back-end processes or components associated with the electronic platform 330). Generally speaking, a destructive read request 370 is a combined request to both read a record 360 and delete the record 360 after it has been read. As explained in further detail below, the destructive read request 370 can be configured to immediately delete the record 360 after a successful read operation for the record 360 is executed, or also can be configured to delete the record 360 at a pre-determined time after a successful read operation is performed.

In certain embodiments, the destructive read request 370 can include a time to live parameter 375 that identifies a lifespan of a record 360 after it has been read. In other words, the time to live parameter 375 will identify a time at which the record 360 identified by the destructive read request 370 will be deleted once the read phase of the destructive read request 370 has been completed. The time to live parameter 375 can be included in header information included with the request or in other data submitted with the request. The time to live parameter 375 can be set to any period of time (e.g., 1 second, 1 minute, 1 hour, 1 day, or 1 year).

In certain embodiments, before a record 360 identified by a destructive read request 370 is deleted, a success signal is required to be received by the persistent database 350, which confirms that the read operation was successfully executed. For example, in the event that the system 300, database server 310 and/or persistent database 350 are utilizing HTTP (Hypertext Transfer Protocol) and/or HTTPS (HTTP Secure) transmission protocols, the success signal can include a HTTP 200 code to indicate that the read operation was successful. Other types of success signals can be utilized in connection with other types of transmission protocols.

Depending upon the specific application or purpose for which the persistent database 350 is being used, it can be advantageous to confirm that the user computer 340 issuing the destructive read request 370 actually receives the record 360 before the record 360 is deleted from the persistent database 350. In such scenarios, the persistent database 350 and/or database application 390 can be configured such that the record 360 is not deleted until a success signal is received from the user computer 340.

As mentioned above, the time to live parameter 375 can be used to delay the automatic deletion of a record (e.g., at some time after the record has successfully been read from the persistent database 350). In certain embodiments, the lifespan specified by the time to live parameter 375 can begin to run immediately upon reception of the success signal. In other embodiments, the lifespan specified by the time to live parameter 375 can begin to run immediately upon reception of the destructive read request 370 at the persistent database 350, but the success signal can still ultimately be required before execution the delete operation.

The manner in which these records 360 are deleted from the persistent database 350 can vary. In certain embodiments, the persistent database 350 and/or database application 390 continuously executes a background process that searches for expired records 360 and removes any records that have been marked for deletion by the destructive read requests 370. The persistent database 350 and/or database application 390 can additionally, or alternatively, include a wake-up timer that alerts the system when a record should be deleted (e.g., alerts the persistent database 350 and/or database application 390 that the lifespan identified by the time to live parameter 375 has expired and the corresponding record should be deleted). The persistent database 350 and/or database application 390 can additionally, or alternatively, facilitate deletion of the records 360 by marking any records 360 to be deleted with timestamps (e.g., timestamps that indicate the time the record is to expire based on the time to live parameter 375). The next time a request is made to access a record that has been marked with a timestamp, the timestamp will be analyzed and compared to the current time, and the record will be deleted automatically if the timestamp indicates the record has expired and access to the record will not be permitted. In some of these embodiments, the record will be deleted automatically only if a success signal for the record has been received, and others of these embodiments, the record will be deleted automatically regardless of whether a success signal for the record has been received. In a different embodiment, the next time any request is made to access any record in persistent database 350, all timestamps are analyzed and compared to the current time, and all records having expired time stamps are deleted automatically, either only after receiving success signals for such records or regardless of whether such success signals have been received.

The above-described system 300 can be utilized in a variety of contexts to improve database efficiency and reduce network traffic. In certain embodiments, the system 300 can be utilized in connection with the electronic platform 330 shown in FIG. 3. The electronic platform 330 can provide a website that includes a plurality of web pages. The function of the website and web pages can vary. In certain embodiments, the website associated with the electronic platform 330 provides users 305 with access to one-time use and/or time-limited records stored in the persistent database 350.

For example, in certain embodiments, the electronic platform 330 can host an online shopping website that offers products and/or services for sale, and that provides promotional content (e.g., coupons, discount codes, sales information, etc.) to users 305 accessing the website with the user computers 340. Records 360 associated with the products, services and/or promotional content can be stored in the persistent database 350 and can include one-time use and/or time-limited records. For example, the website can offer unique discount codes to thousands of users 305 as part of a promotion. The discount codes should be deleted from the persistent database 350 after they are distributed to the users 305 and/or used by the users 305 to ensure that other users 305 are not able to use the discount codes once they are distributed and/or used. Thus, when a request is submitted to the persistent database 350 to retrieve a discount code from the records 360, a destructive read request 370 can be utilized to automatically delete the record after it has been read from the persistent database 350. This is different from conventional techniques, which would require separate read and delete requests to remove the records 360 from the persistent database 350.

As another example, the electronic platform 330 can provide passwords to users 305 (e.g., Wi-Fi passwords or trial subscription passwords) to users that are only valid for 24 hours. Because the passwords are only valid for a limited duration and should not be usable after the 24 hour time period has expired, a destructive read request 370 that includes a time to live parameter 375 (e.g., specifying 24 hours) can be utilized to distribute the passwords to users 305. When a record 360 associated with a password is read from the persistent database 350, the record 360 will initially be marked for deletion and will be deleted from the persistent database 350 upon expiration of the time to live parameter 375 (even if no success signal has been received). The record 360 remains in the persistent database 350 during the 24 hour time period (e.g., to permit users to login) and can be read from the persistent database 350 during this period. Once the time period expires, the record 360 is deleted automatically from the persistent database 350.

It should be recognized that the above examples are merely meant to illustrate how the techniques described herein can be implemented and are not intended to be limiting. It should also be recognized that the electronic platform 330 can be configured to perform functions others than those mentioned above.

As evidenced by this disclosure, the principles described herein are rooted in computer technologies that overcome existing problems in known database systems, specifically problems dealing with increasing available bandwidth, reducing network traffic and efficiently managing databases. Known database systems cannot handle massive amounts of network traffic or database requests, while keeping latency to an acceptable level and/or avoiding server crashes. The principles described in this disclosure provide a technical solution (e.g., one that utilizes novel database protocols and retrieval techniques) for overcoming such problems. This technology-based solution marks an improvement over existing computing capabilities and functionalities related to database systems by improving bandwidth, reducing network traffic and permitting greater database efficiency (e.g., by processing combined read/delete requests). The novel systems are designed to improve the way databases store, retrieve, delete and transmit data.

Figure 4:
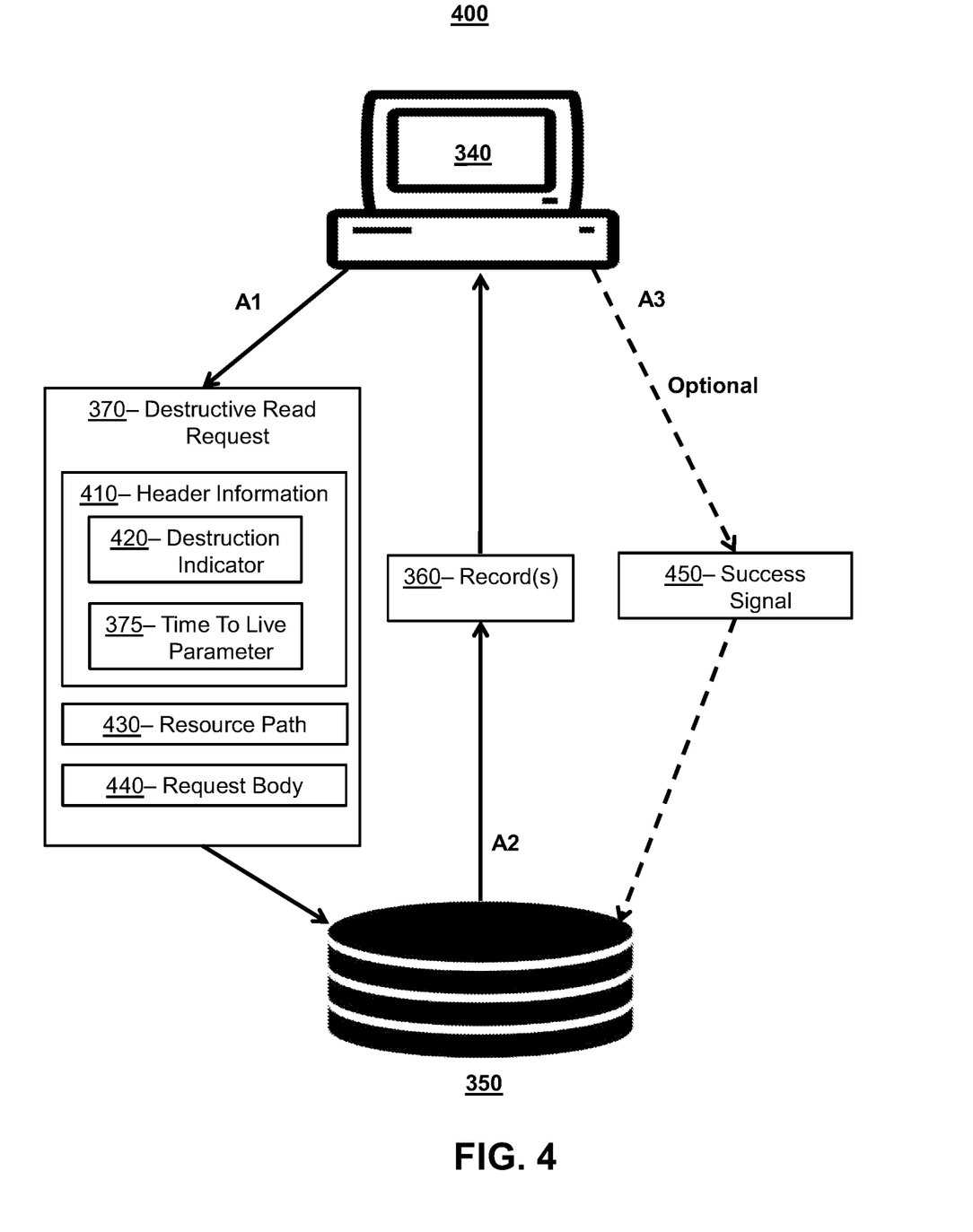
FIG. 4 is a sequence diagram illustrating a sequence of activities according to certain embodiments.

Turning ahead in the drawings, FIG. 4 illustrates an activity diagram for an activity sequence 400 according to certain embodiments. Activity sequence 400 is merely exemplary and is not limited to the embodiments presented herein. In certain embodiments, system 300 and user computer 340 shown in FIG. 3 can be suitable to perform the activity sequence 400.

At A1, a user computer 340 performs an activity of transmitting a destructive read request 370 to a persistent database 350. The destructive read request 370 includes header information 410, a resource path 430 and a request body 440. The header information 410 can include a destruction indicator 420 that converts the request from a standard read request (e.g., a GET request) to a destructive read request 370. The destruction indicator 420 can be utilized to extend an existing transmission protocol to incorporate destructive read capabilities into read commands that are already included in the protocol. For example, the HTTP/HTTPS transmission protocol can be extended to utilize the destructive read capabilities by incorporating a new header parameters (e.g., the destruction indicator 420 and/or time to live parameter 375) into the header information 410 for a GET request. When the destruction indicator 420 included in the header information 410 is set to a certain value (e.g., TRUE), the persistent database 350 and/or database application 390 (FIGS. 3 & 6) are configured to interpret the GET request to be a destructive read request 370. Otherwise, if the destruction indicator 420 is not set, the persistent database 350 and/or database application 390 (FIGS. 3 & 6) will interpret the request to be a standard GET request that does not include an automatic delete function. Similar modifications can be made to other types of transmission protocols and/or database protocols.

The header information 410 can also comprise the time to live parameter 375 that identifies a lifespan for a record 360 as described above. The time to live parameter 375 is an optional heading parameter. In certain embodiments, if the time to live parameter 375 is not specified, then the record 360 identified by the destructive read request 370 will be deleted immediately after it has been successfully read.

The resource path 430 specifies the path of the record 360 that is being requested. The resource path 430 identifies a uniform resource locator (URL) associated with the record 360, a uniform resource identifier (URI) record 360, and/or other information that identifies the location of the record 360.

The request body 440 is an optional parameter. The request body 440 can provide additional information that is utilized to identify one or more of the records 360 stored in the persistent database 350. For example, the request body 440 can include a query string that is utilized by the persistent database 350 and/or database application 390 (FIGS. 3 & 6) to identify one or more of the records 360 that are the subject of the destructive read request 370. In some cases, the query string can be generated based on inputs that are provided by a user 305 via an input form (e.g., an input form included in a web page that is displayed on a computer device 340).

Moving on, at A2, the resource path 430 and/or information included in the request body 440 are utilized to identify and read one or more records 360 from the persistent database 350, and the records 360 are transmitted to the user computer 340. In certain embodiments, the one or more records 360 are read from the persistent database 350 and immediately deleted in response to receiving a local success signal (e.g., a HTTP 200 response) from persistent database 350 confirming that the read operation was successful. However, in other embodiments, it can be useful to confirm that the records 360 were actually received by the user computer 340 that requested them before deleting the records 360 from the persistent database 350. In some of these other embodiments, it also can be useful to confirm that the records 360 were successfully ready by the user computer 340 before deleting the records 360 from the persistent database 350.

Thus, at A3, the success signal 450 is optionally sent by user computer 340 to confirm that the records 360 were actually received (and, in some embodiments, successfully read) by the user computer 340 (FIG. 3) before the records 360 are deleted from the persistent database 350. Thus, reception of either the local the success signal 450 (e.g., a HTTP 200 response) and/or a remote success signal 450 from a user computer (FIG. 3) can be utilized to enable deleting of the records 360.

Figure 5:
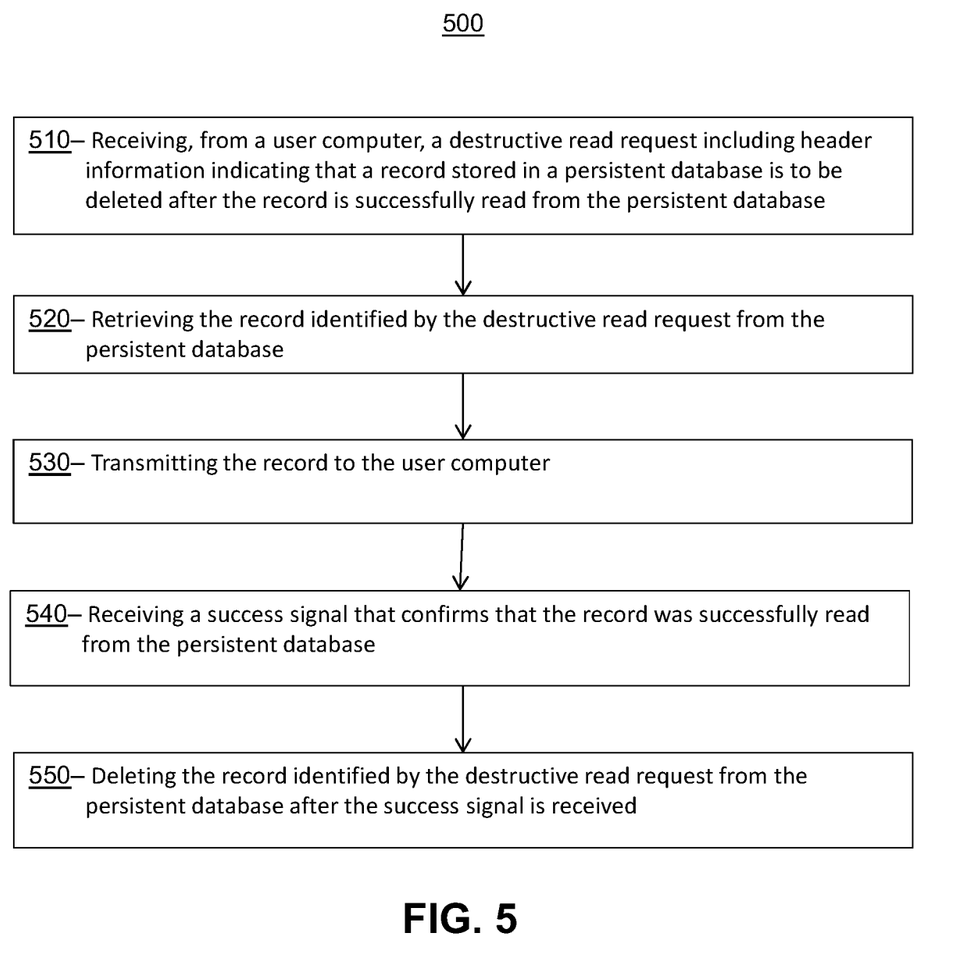
FIG. 5 is a flowchart for a method according to certain embodiments.
Figure 6:
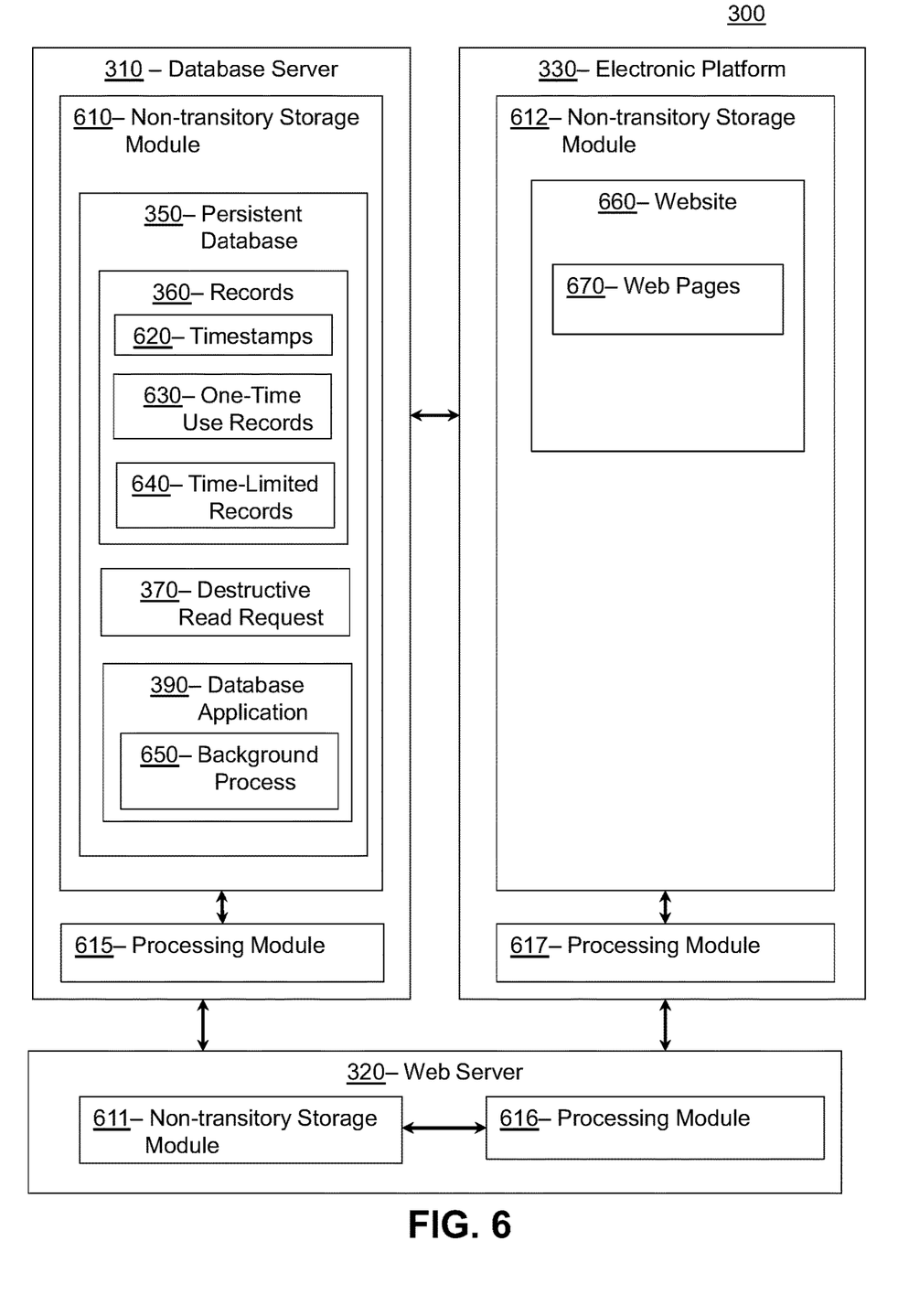
FIG. 6 illustrates a representative block diagram of a portion of the system of FIG. 3, according to an embodiment.

FIG. 5 illustrates a flow chart for a method 500 according to certain embodiments. Method 500 is merely exemplary and is not limited to the embodiments presented herein. Method 500 can be employed in many different embodiments or examples not specifically depicted or described herein. In certain embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 610 (FIG. 6). Such non-transitory memory storage modules can be part of a computer system such as database server 310 (FIGS. 3 & 6), web server 320 (FIGS. 3 & 6) and/or electronic platform 330 (FIGS. 3 & 6). The processing module(s) can be similar or identical to the processing module(s) described above with respect to computer system 100 (FIG. 1).

Method 500 can comprise an activity 510 of receiving, from a user computer, a destructive read request 370 (FIGS. 3, 4 & 6) including header information 410 (FIG. 4) indicating that a record 360 (FIGS. 3, 4 & 6) stored in a persistent database 350 (FIGS. 3, 4 & 6) is to be deleted after the record is successfully read from the persistent database 350 (FIGS. 3, 4 & 6). The destructive read request 370 (FIGS. 3, 4 & 6) can be transmitted by a user computer 340 (FIGS. 3 & 4) over a network 380 (FIG. 3) to a database server that includes the persistent database 350 (FIGS. 3, 4 & 6). The header information 410 (FIG. 4) for the destructive read request 370 (FIGS. 3, 4 & 6) can include a destruction indicator 420 (FIG. 4) that converts the request from a read request (e.g., GET request) to a destructive read request 370 (FIGS. 3, 4 & 6). It should be noted that the destructive read request 370 (FIGS. 3, 4 & 6) can identify multiple records 360 (FIGS. 3, 4 & 6) that are to be read and then deleted.

Method 500 can comprise an activity 520 of retrieving the record 360 (FIGS. 3, 4 & 6), which was identified by the destructive read request 370 (FIGS. 3, 4 & 6), from the persistent database 350 (FIGS. 3, 4 & 6). The record 360 (FIGS. 3, 4 & 6) can be retrieved using the data specified in the resource path 430 (FIG. 4) and/or request body 440 (FIG. 4) of the destructive read request. In many embodiments, activity 520 can be performed in response to receiving the destructive read request in activity 510.

Method 500 can comprise an activity 530 of transmitting the record 360 (FIGS. 3, 4 & 6) to the user computer 340 (FIGS. 3 & 4). For example, the database server storing the persistent database 350 (FIGS. 3, 4 & 6) can transmit the record 360 (FIGS. 3, 4 & 6) over the network 380 (FIG. 3) to the user computer 340 (FIGS. 3 & 4) that requested the record. As noted in FIG. 5, activity 530 can occur after 520. Retrieving the record 360 (FIGS. 3, 4 & 6) in activity 520 and/or transmitting the record 360 (FIGS. 3, 4 & 6) also can include reading the record 360 (FIGS. 3, 4, & 6).

Method 500 can comprise an activity 540 of receiving a success signal 450 (FIG. 4) that confirms that the record 360 (FIGS. 3, 4 & 6) was successfully retrieved, transmitted, and/or read from the persistent database and/or received and/or read by the user computer 340 (FIGS. 3 & 4). The success signal 450 (FIG. 4) can be generated locally by the persistent database 350 (FIGS. 3, 4 & 6) or other component of system 300. For example, upon performance of a read operation, a signal including the HTTP 200 code can be received to confirm that the read operation was successful. In other embodiments, the success signal 450 (FIG. 4) can alternatively, or additionally, be generated remotely by and/or received from the user computer 340 (FIGS. 3 & 4) that requested the record 360 (FIGS. 3, 4 & 6) to confirm that the record was received and/or ready by the user computer 340 (FIGS. 3 & 4). Activity 540 can be performed after activity 530.

Method 500 can comprise an activity 550 of deleting the record 360 (FIGS. 3, 4 & 6) identified by the destructive read request 370 (FIGS. 3, 4 & 6) from the persistent database 350 (FIGS. 3, 4 & 6) after the success signal 450 (FIG. 4) is received. In many embodiments, in response to receiving the success signal 450 (FIG. 4) in activity 540, activity 550 can include automatically deleing the record 360 (FIGS. 3, 4 & 6) from the persistent database 350 (FIGS. 3, 4 & 6) without receiving another instruction to delete the record 360 (FIGS. 3, 4 & 6).

As mentioned above, the manner in which the record 360 (FIGS. 3, 4 & 6) is deleted can vary. For example, the record 360 (FIGS. 3, 4 & 6) can be deleted automatically using a background process that continuously scans the persistent database 350 (FIGS. 3, 4 & 6) for expired records, using a time-stamping procedure, and/or using a wake-up timer.

FIG. 6 illustrates a block diagram of a portion of system 300 comprising the database server 310, the web server 320, and the electronic platform 330 according to the embodiment shown in FIG. 3. Each of the database server 310, the web server 320, and the electronic platform 330 is merely exemplary and not limited to the embodiments presented herein. Each of the database server 310, the web server 320, and the electronic platform 330 can be employed in many different embodiments or examples not specifically depicted or described herein. In some embodiments, certain elements or modules of the database server 310, the web server 320, and/or the electronic platform 330 can perform various procedures, processes, and/or acts. In other embodiments, the procedures, processes, and/or acts can be performed by other suitable elements or modules.

The database server 310 includes one or more non-transitory storage module(s) 610 and one or more processing module(s) 615. Similarly, the web server 320 includes one or more non-transitory storage module(s) 611 and one or more processing module(s) 616, and the electronic platform 330 includes one or more non-transitory storage module(s) 612 and one or more processing module(s) 617. The database server 310, the web server 320, and the electronic platform 330 are configured to communicate with each other either directly or over a network 380 (FIG. 3).

The electronic platform 330 includes a website 660 that is comprised of one or more web pages 670 stored in one or more non-transitory storage module(s) 612. The website 660 and associated web pages 670 can generally represent any type of website. For example, the website 660 can represent an online shopping website, a content delivery website or any other type of website.

The database server 310 stores a persistent database 350 in one or more non-transitory storage modules 610 that provides records 360 associated with the website 660. For example, the records 360 can include data associated with products and services offered for sale on the website 660. The records 360 can include promotional content (e.g., coupons, discount codes and limited-time sales offerings) associated with the website 660. The records 360 can include one-time use records 630. As explained above, one-time use records 630 can represent records 630 that are designed to be read once and thereafter deleted. The records 360 can further include time-limited records 640. As explained above, time-limited records 640 can represent records 630 that are designed to be deleted at a predetermined period of time after being read.

The destructive read requests 370 can be utilized to delete the records 360. For example, a destructive read request 370 that includes a time to live parameter 375 (FIGS. 3 & 4) can be used to delete a time-limited record 640 after the predetermined period of time has lapsed. Likewise, a destructive read request 370 that does not specify a time to live parameter 375 (FIGS. 3 & 4) can be used to immediately delete the one-time use records 630 after being read.

The records 360 can be deleted in various ways. In certain embodiments, the database application 390 that assists with maintaining the persistent database 350 executes a background process 650 that continuously runs in the background to identify and delete any expired records 360. Timestamps 620 also can assist with deleting records 360 as described above. For example, in the same or different embodiment, a record 360 identified by destructive read requests 370 can be marked with a timestamp 620 (e.g., that identifies the lifespan of the record) after a success signal 450 (FIG. 4) is received confirming that the record 360 has been read. The next time an attempt is made to access the record 360, the timestamp 620 will be checked, and the record will be deleted automatically if the timestamp 620 indicates the lifespan of the record has expired such that the record 360 cannot be read or otherwise accessed.

Although systems and methods for improving network bandwidth and database efficiency have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage media storing computing instructions configured to run on the one or more processors and perform acts of:
   providing one or more passwords to one or more users associated with one or more records, wherein the one or more passwords are valid for a period of time;
   receiving, from a user computer, a destructive read request including header information indicating that a record of the one or more records is associated with a password of the one or more passwords, wherein the header information comprises a time to live parameter for the record that specifies a lifespan of the record, wherein the record of the one or more records is stored in a persistent database and is to be deleted after expiration of the time to live parameter independent of whether the record is successfully read from the persistent database, wherein the time to live parameter is set based on the period of time for the password, and wherein the destructive read request is utilized to distribute the one or more passwords to the one or more users;
   when the time to live parameter expires before receiving a success signal that confirms that the record was successfully read from the persistent database, automatically deleting the record from the persistent database without receiving another instruction to delete the record; and
   when the success signal is received that confirms that the record was successfully read from the persistent database before the time to live parameter expires:
   marking the record to be deleted upon expiration of the time to live parameter; and
   upon expiration of the time to live parameter, automatically deleting the record, when it still exists in the persistent database, from the persistent database without receiving another instruction to delete the record.

2. The system of claim 1, wherein the header information in the destructive read request further comprises a destruction indicator that converts a standard read request to the destructive read request.

3. The system of claim 1, wherein the persistent database executes a background process that periodically removes expired records of the one or more records from the persistent database.

4. The system of claim 3, wherein:
   the background process is configured to automatically delete the record in response to determining that the lifespan of the record specified by the time to live parameter for the record has expired.

5. The system of claim 3, wherein:
   the persistent database writes a timestamp to the record that is identified by the destructive read request; and
   the timestamp is utilized to determine whether the lifespan of the record has expired.

6. The system of claim 1, wherein the persistent database is a NoSQL key-value database that stores the one or more records in a non-relational manner.

7. The system of claim 1, wherein, in response to receiving the destructive read request, the persistent database is configured to confirm that a user of the one or more users submitting the destructive read request via the user computer is authorized to delete the record from the persistent database.

8. The system of claim 1, wherein the success signal is generated locally by the persistent database to indicate that the record was successfully read.

9. The system of claim 1, wherein the success signal is generated remotely by the user computer to further indicate that the record was successfully received by the user computer.

10. The system of claim 1, wherein the record of the one or more records represents a one-time use record or a limited duration record that is automatically deleted after being read.

11. A method comprising:
providing one or more passwords to one or more users associated with one or more records, wherein the one or more passwords are valid for a period of time;
receiving, from a user computer, a destructive read request including header information indicating that a record of the one or more records is associated with a password of the one or more passwords, wherein the header information comprises a time to live parameter for the record that specifies a lifespan of the record, wherein the record of the one or more records is stored in a persistent database and is to be deleted after expiration of the time to live parameter independent of whether the record is successfully read from the persistent database, wherein the time to live parameter is set based on the period of time for the password, and wherein the destructive read request is utilized to distribute the one or more passwords to the one or more users;
when the time to live parameter expires before receiving a success signal that confirms that the record was successfully read from the persistent database, automatically deleting the record from the persistent database without receiving another instruction to delete the record; and
when the success signal is received that confirms that the record was successfully read from the persistent database before the time to live parameter expires:
marking the record to be deleted upon expiration of the time to live parameter; and
upon expiration of the time to live parameter, automatically deleting the record, when it still exists in the persistent database, from the persistent database without receiving another instruction to delete the record.

12. The method of claim 11, wherein the header information in the destructive read request further comprises a destruction indicator that converts a standard read request to the destructive read request.

13. The method of claim 12, wherein the persistent database executes a background process that periodically removes expired records of the one or more records from the persistent database.

14. The method of claim 13, wherein:
the background process is configured to automatically delete the record in response to determining that the lifespan of the record specified by the time to live parameter for the record has expired.

15. The method of claim 13, wherein the persistent database writes a timestamp to the record that is identified by the destructive read request, and the timestamp is utilized to determine whether the lifespan of the record has expired.

16. The method of claim 1, wherein the persistent database is a NoSQL key-value database that stores the one or more records in a non-relational manner.

17. The method of claim 11, wherein, in response to receiving the destructive read request, the persistent database is configured to confirm that a user of the one or more users submitting the destructive read request via the user computer is authorized to delete the record from the persistent database.

18. The method of claim 11, wherein the success signal is generated locally by the persistent database to indicate that the record was successfully read.

19. The method of claim 11, wherein the success signal is generated remotely by the user computer to further indicate that the record was successfully received by the user computer.

20. The method of claim 11, wherein the record of the one or more records represents a one-time use record or a limited duration record that is automatically deleted after being read.

* * * * *